March 5, 1940. H. LEHDE 2,192,446
GARMENT TRIMMING MACHINE
Filed Oct. 7, 1939 2 Sheets-Sheet 1
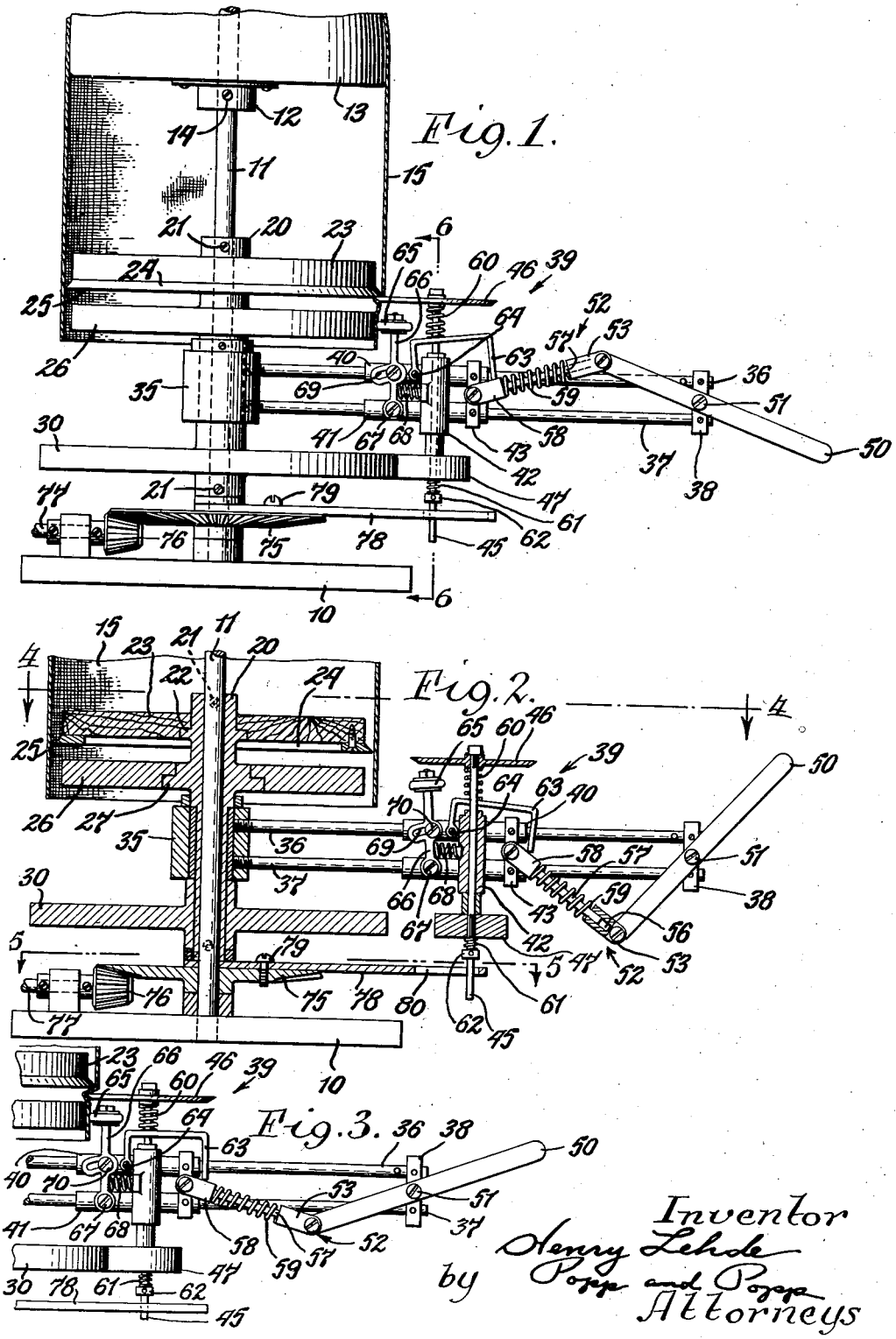
Inventor
Henry Lehde
by Pope and Pope
Attorneys

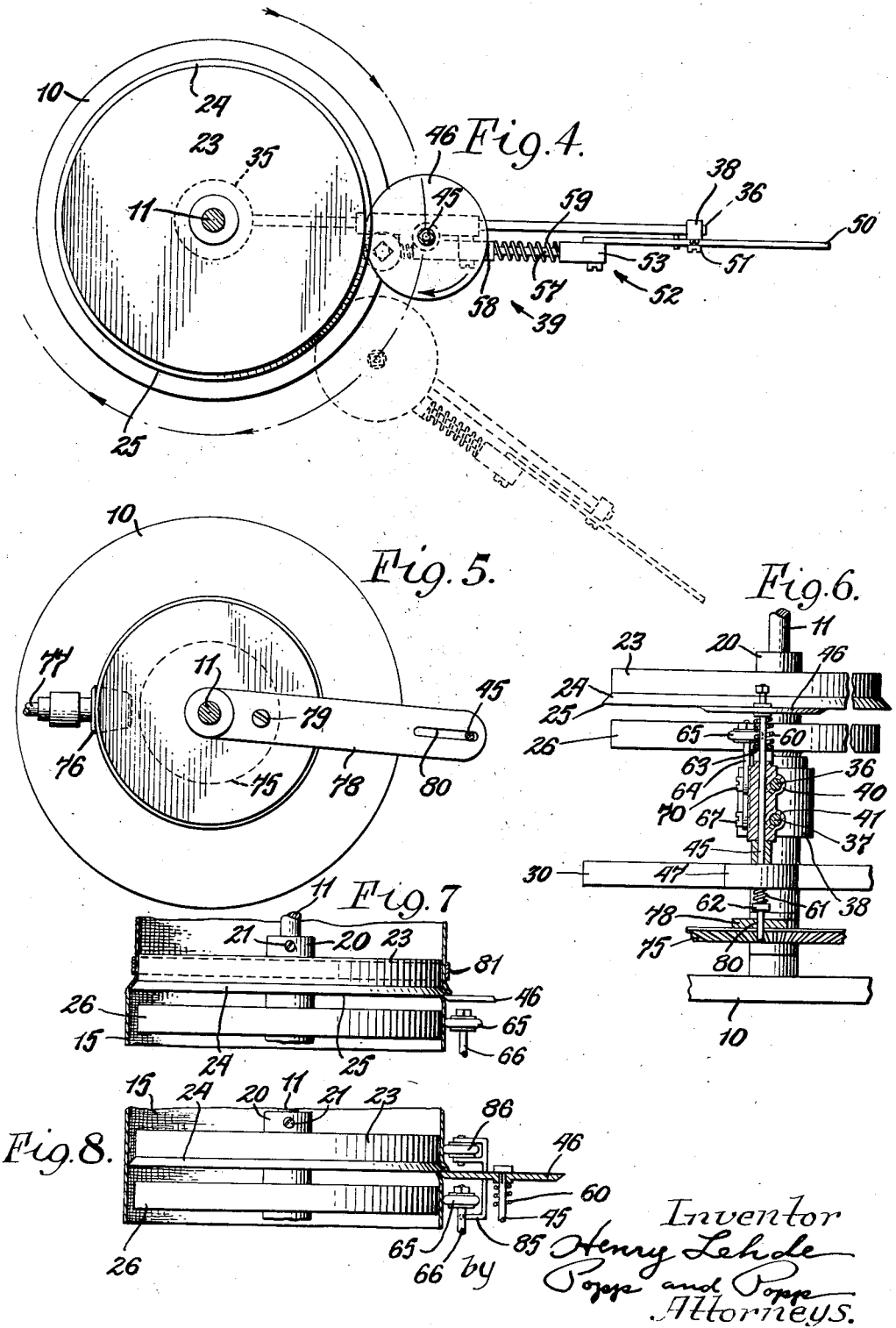

Patented Mar. 5, 1940

2,192,446

UNITED STATES PATENT OFFICE 2,192,446

GARMENT TRIMMING MACHINE

Henry Lehde, Brooklyn, N. Y.

Application October 7, 1939, Serial No. 298,434

19 Claims. (Cl. 164—71)

This invention relates to apparatus for trimming the bottoms of skirts, dresses and the like to a straight edge, this operation, which is known as "sloping," being effected prior to hemming the bottoms of the skirts in the commercial production of dresses. As now commercially practiced, skirts are sloped by placing the skirt or dress on a form and manually trimming the bottom of the skirt to a straight edge with a pair of scissors. This method is necessarily slow, tedious and inaccurate.

The principal object of the present invention is to provide a very simple and easily operated apparatus for accurately trimming the bottoms of skirts, dresses or the like to a straight edge at any desired length.

Another object of the invention is to provide such apparatus having a smooth and positive cutting action on the skirt.

Another object of the invention is to provide such apparatus which is adaptable to skirts of varying width and form, particularly to skirts having different draped effects.

Another object of the invention is to provide such apparatus in which the dress can be readily draped around a form and in which the proper cutting of the bottom of the skirt along the desired line is insured.

Another object of the invention is to provide such apparatus which can be operated either manually or by power.

Another aim is to provide such apparatus which is simple and inexpensive in construction and is convenient in operation and also in which there is no danger of injury to the operator.

Another aim of the invention is to provide such apparatus in which the cutting edges are maintained in a sharp condition for a long period of time and which will remain in serviceable condition for a long period of time without requiring repairs or adjustments other than those necessary to adapt the apparatus to skirts of different lengths.

In the accompanying drawings:

Fig. 1 is a side elevation of a dress trimmer embodying my invention and showing the parts in the position occupied during the actual sloping of a skirt.

Fig. 2 is a vertical section through the apparatus shown in Fig. 1 and showing the position of the parts when a dress is being hung upon the form preparatory to sloping.

Fig. 3 is a view similar to Fig. 1 and showing an intermediate position of the parts.

Figs. 4 and 5 are horizontal sections, taken on the correspondingly numbered lines on Fig. 2.

Fig. 6 is a fragmentary vertical section, taken on line 6—6, Fig. 1.

Fig. 7 is a fragmentary view similar to Fig. 1 and showing an elastic band applied to the bottom of the skirt to facilitate the sloping operation.

Fig. 8 is a view similar to Fig. 7 showing a modified form of the invention.

In the form of the invention illustrated in Figs. 1–7 the numeral 10 represents a base supporting a post or shaft 11 carrying a bushing 12 upon which a dress form 13 is mounted. To permit of adjusting the apparatus to trim the skirts to different lengths, the dress form 13 is preferably adjustable to different vertical positions on the post 11 and for this purpose the bushing 12 is shown as being held in place by a set screw 14. The dress 15 to be sloped is hung on the dress form 13 with the skirt hanging over the sloping mechanism arranged immediately above the base 10. The sloping mechanism is supported on a sleeve 20, this sleeve being non-rotatably mounted on the lower end of the post 11.

To permit of adjusting the trimming mechanism to skirts of different length, this sleeve is preferably adjustable to different vertical positions on the post 11 and for this purpose is shown as being connected to the post 11 by a pair of set screws 21 which can be loosened to permit the sleeve to be moved up or down and then tightened to hold the sleeve in any desired position. The sleeve is shown as being provided with a flange 22 supporting a horizontal disk 23, this disk being preferably made of wood or other nailable material to permit of securing the bottom of the skirt to it by means of thumb tacks or the like. This disk 23 is non-rotatably mounted on the flange 22 and is therefore held stationary during the operation of the apparatus. To the underside of this disk is suitably attached a shearing ring 24, the sharpened edge 25 of which preferably extends outwardly beyond the periphery of the disk 23.

Immediately below the disk 22 another disk 26 is non-rotatably secured to the sleeve 20, this disk 26 preferably being of substantially the same diameter as the disk 23 and being shown as non-rotatably supported on a flange 27 provided on the sleeve 20. Between the disk 26 and the base of the apparatus the sleeve 20 carries a third non-rotatable friction disk 30 which can be secured to the lower end of the sleeve 20 in any suitable manner and is preferably of larger diameter than the disks 23 and 26.

Between the disks 26 and 30 the sleeve 20 carries a rotatable bushing 35 which is shown as being supported on the hub of the disk 30. This bushing carries a pair of vertically spaced radially projecting rods 36 and 37, the outer ends of these rods being shown as connected by a spacer 38 which can be attached to the ends of these rods in any suitable manner. The rods 36 and 37 slidingly support a cutting mechanism indicated generally at 39 and including a cutting disk cooperating with the stationary cutting or shearing ring 24 to trim the lower end of the skirt 15 to the desired length.

This cutting mechanism is shown as being carried by a pair of horizontal sleeves 40 and 41 slidably mounted on the rods 36 and 37 and connected to one another by a bearing post 42 which is shown as being formed integrally with the sleeves 40 and 41 and arranged at one side of these sleeves. The rear ends of the sleeves 40 and 41 are shown as being connected by a spacer 43. The bearing post 42 is formed to provide a bearing for a vertical shaft 45, a horizontal cutting disk 46 being secured to the upper end of this shaft in any suitable manner, this cutting disk being adapted to cooperate with the cutting ring 24 in trimming the lower edge of the skirt 15. A friction wheel 47 is non-rotatably secured to the lower end of the shaft 45 in any suitable manner which will permit vertical movement of the shaft 45 in the wheel 47, this friction wheel 47 being arranged to engage the periphery of the stationary disk 30 when the sliding cutting mechanism 39 is slid inwardly to its operative position.

The mechanism for sliding the cutting mechanism into and out of its operative position comprises a handle 50 which is pivotally secured adjacent its center, as indicated at 51, to one side of the spacer 38 and has its inner end connected by a compressible link, indicated generally at 52, to the spacer 43 connecting the rear ends of the sliding sleeves 40 and 41. This compressible link 52 can be of any form and is shown as having an end 53 pivotally secured to the inner end of the handle 50 and provided with a slideway 56 receiving a rod 57 carried by the other end 58 of the link, this other end being pivotally secured to the spacer 43. A helical compression spring 59 is shown as surrounding the rod 57 of this compressible link and as interposed between the two ends 53 and 58 thereof so as normally to urge the compressible link 52 into an expanded condition.

The cutting disk 46 is movable vertically into operative and inoperative positions and for this purpose the shaft 45 is slidably mounted in the bearing post 42 and in the friction wheel 47 and is provided with a helical compression spring 60 surrounding its upper end immediately below the cutting disk 46 and with a helical compression spring 61 surrounding its lower end and interposed between the friction wheel 47 and a collar 62 secured to the lower end of the shaft 45. The underside of the relatively strong compression spring 60 at the upper end of the shaft 45 is supported by the central bar of a U-shaped arm 63, one end of which is pivoted, as indicated at 64, to the upper sliding sleeve 40 adjacent its center and the other end of which is supported by the inner end 58 of the compressible link 52.

In order to hold the lower end of the skirt 15 against displacement during the cutting operation this end is held against the disk 26 by a wheel 65 which is moved into engagement with the lower end of the skirt and against the periphery of the stationary disk 26 when the sliding cutting mechanism is moved inwardly to its operative position. This wheel 65 preferably has a rim or tire of resilient material and is rotatably mounted at the upper end of an arm 66, the lower end of which is pivoted, as indicated at 67, to the lower sliding sleeve 41 adjacent its rear end. The arm 66 is shown as being yieldingly held in an inwardly projected position by a helical compression spring 68 interposed between the lower end of this arm and the vertical bearing post 42 which carries the shaft 45. The movement of the arm 66 under the influence of this spring and its movement in the opposite direction on engaging the skirt 15 and the periphery of the stationary disk 26 is limited by an arcuate slot 69 in which a stop screw 70 is arranged, this stop screw 70 being secured to the upper sliding sleeve 40.

To permit of rotating the cutting mechanism by power a bevel gear 75 is shown as rotatably mounted on the lower end of the post 11, this gear being driven by a pinion 76 mounted on a power shaft 77 which can be driven by an electric motor (not shown) or from any other suitable source of power. To the upper face of this gear 75 is secured an arm 78 preferably by means of a screw 79 or other fastening which can be removed so as to disconnect the arm 78 from the gear 75. The arm 78 is slotted at its outer end, as indicated at 80, this slot extending radially and receiving the lower end of the shaft 45. The slot 80 permits the sliding cutting mechanism to be moved radially inwardly and outwardly, along the rods 36 and 37, independently of the power arm 78.

If desired the lower end of the dress 15 can be secured to the disk 23 to insure the proper sloping of the dress. As illustrated in Fig. 7 an elastic band 81 can be stretched around the lower end of the skirt 15 and the periphery of the disk 23 and the ends of this elastic band held by a thumb tack (not shown) passed through the ends of the band and into the periphery of the wooden disk 23.

In sloping dresses by the apparatus illustrated in Figs. 1–7 the parts are first moved to the position illustrated in Fig. 2 by raising the handle so as to withdraw the sliding cutting mechanism 39 to its outer inoperative position on the rods 36, 37 as illustrated in Fig. 2. The operator then hangs the dress 15 on the dress form 13 and drapes the skirt with its folds in proper order around the stationary disks 23 and 26 of the trimming mechanism at the base of the form. The operator can then pass the elastic band 81 around the bottom of the skirt and the periphery of the wooden disk 23 and secure the ends of this band in position by thumb tacks. The operator then depresses the handle 50. Since the handle 50 is pivoted at its center the inner end of the handle is moved inwardly and effects an inward movement of the compressible link 52, pressure being applied to the helical compression spring 59 forming a part of this link and this pressure being transmitted to the inner end 58 of the link. This radially inward movement of the helical compression link moves the assembly carried by the sliding sleeves 40 and 41 inwardly along the rods 36 and 37 thereby to move the rotating cutting disk 46 into engagement with the cloth of the garment 15 and the friction wheel 47 into engagement with the periphery of the stationary friction disk 30. At the same time the wheel 65 is moved into engagement with the bottom of the skirt 15 and against the periphery of the stationary disk 26 so that the free end of the skirt is securely held immediately below the point of cutting. In this position of the parts, illustrated in Fig. 3, the rotating cutting disk 46 has not been moved upwardly into operative relation with the cutting edge of the stationary cutting ring 24 carried by the disk 23.

This movement of the rotating cutting wheel 46 into operative relation with the stationary cutting edge 25 is effected by a further depression of the handle 50 from the position shown in Fig. 3 to the position shown in Fig. 1. This final movement of the handle 50 serves to carry the pivot between the inner end of the handle 50 and the compressible link 52 above dead center so that the position of this handle and the link, as shown in Fig. 1, is automatically maintained until the handle 50 is deliberately raised. This upward movement of the compressible link 52 above dead center also raises the outer end of the U-shaped lever 63 and exerts sufficient pressure on the lower end of the relatively strong compression spring 60 to raise the shaft 45. This upward movement of the shaft 45 causes the upper face of the rotating cutting disk 46 to bear against the lower face of the stationary cutting ring 24 under the pressure of the spring 60.

Upon then applying power to the shaft 77 the gear 75 and arm 78 are rotated to swing the arm 78 around the dress. The rotating movement of the arm 78 is transmitted to the shaft 45 so as to cause the slidable cutting mechanism 39 and its supporting rods 36 and 37 to rotate around the dress, the rods 36 and 37 being mounted on the rotatable bushing 35 for this purpose. At the same time the rotation of the cutting mechanism 39 around the post 11 as an axis causes the friction wheel 47 to be rotated on its axis because of the frictional engagement of this wheel with the periphery of the stationary friction disk 30. The rotation of this friction wheel 47 effects a rotation of the shaft 45 in the bearing provided by the vertical post 42 and since this shaft carries the rotating cutting disk 46, this disk is likewise rotated. In operation the cutting disk 46 is rotated about the axis of the main supporting post 11 and about its own axis, as indicated by the arrows in Fig. 4 and it will therefore be seen that the cutting edges 25 of the stationary cutting disk 24 and the rotating cutting disk 46 tend to gather the material of the dress between them, thereby to insure the sloping of the garment along a straight line.

It will also be noted that since the stationary friction disk 30 is of larger diameter than the cutting ring 24 and that since the friction wheel 47 driven by the stationary friction disk 30 is of smaller diameter than the rotating cutting wheel 46, the cutting wheel 46 is rotated at a relatively high speed so as to effect a positive cutting action in cooperation with the stationary cutting edge 25 rather than a mere shearing action as would be the case if the two cutting edges had a mere rolling relation to one another. Since the wheel 65 firmly holds the lower end of the skirt 15 against the disk 26 and as this roller travels around immediately below the cutting disk 46 it will be seen that the material of the dress is securely held in place above and below the cutting point so as to insure the trimming of the skirt along a straight line.

In the modified form of the invention illustrated in Fig. 8, the arm 66 carrying the small holding wheel 65 is shown as additionally provided with a laterally and upwardly projecting extension 85, this extension carrying another small roller 86 similar to the roller 65 and arranged to engage the periphery of the stationary disk 23 which carries the stationary cutting ring 24. It will be seen that with this form of the invention it is unnecessary to apply the elastic tape 81 around the bottom of the skirt and against the periphery of the stationary disk 23 since the skirt is held above and below the line of cutting by the two rollers 86 and 65.

After the rods 36 and 37 have been swung completely around the dress form and the sloping of the dress completed, the operator releases the power drive to the shaft 77 so as to discontinue rotation of the cutting mechanism around the main post 11 as an axis. He thereupon lifts the handle 50 to the position shown in Fig. 2, this lifting moving the compressible link 52 below dead center and also moving the cutting mechanism outwardly along the rods 36 and 37 to the position shown in Fig. 2. This breaks the driving connection between the stationary friction disk 30 and the friction wheel 47 thereby to discontinue rotation of the cutting disk 46 and also serves to lower the U-shaped arm 63 so as to permit this rotating cutting disk 46 to drop. At the same time this rotating cutting disk, together with the wheel 65, is moved radially outwardly from the cutting edge 25 and disk 26 with which they cooperate. The dress 15 can thereupon be removed from the form 13 and another dress hung upon this form and sloped in the manner just described.

If it is desired to trim the skirts to a greater length, the dress form 13 can be elevated on the post 11 by loosening the set screw 14 and raising the form 13 or the sleeve 20 can be lowered by loosening the set screws 21. In either case the dress form 13 will be arranged at a greater distance from the trimming mechanism so that the trimmed skirt will be longer.

From the foregoing it will be seen that the dress trimmer forming the subject of the invention provides a very simple and easily operated mechanism for accurately trimming the bottom of skirts, dresses or the like to a straight line at any desired length and in which the parts provide a smooth and positive cutting action. It will also be seen that the direction and speed of rotation of the rotatable cutting disk 46 tends to pull the folds of the dress toward the cutting point and thereby minimize any tendency for the folds to be disarranged.

It will also be seen that the features of the invention can be widely modified, the invention essentially consisting in a rotating shearing edge traveling around a stationary shearing edge which is approximately the size of the garment being cut and over which the dress is hung. The invention is therefore not to be limited to the detailed embodiment shown and described, but is to be accorded the full range of equivalents comprehended by the accompanying claims.

I claim as my invention:

1. In a garment trimming machine, the combination of means for supporting said garment, a rotating cutting member, means for rotating said cutting member and means for moving said rotating cutting member around the garment with its cutting edge in engagement therewith.

2. In a garment trimming machine, the combination of means for supporting said garment, a rotating cutting member, means for rotating said cutting member, means for moving said rotating cutting member around the garment with its cutting edge in engagement therewith and means for holding said garment at the point where said cutting member engages said garment.

3. In a garment trimming machine, the combination of means for supporting said garment to hang around a vertical axis, a horizontal rotary cutting member, means for rotating said cutting member around its axis and means for simultaneously rotating said cutting member about said vertical axis and in cutting engagement with said garment.

4. In a garment trimming machine, the combination of a vertical post, means for hanging the garment on said post, an arm rotatably mounted on said post, a rotating cutting member mounted on said arm to rotate about a vertical axis, means for rotating said cutting member around said axis and means for simultaneously rotating said arm about said post with said cutting member in engagement with said garment.

5. In a garment trimming machine, the combination of a vertical post, means for hanging the garment on said post, an arm rotatably mounted on said post, a rotating cutting member mounted on said arm to rotate about a vertical axis, means for rotating said cutting member around said axis, means for simultaneously rotating said arm about said post with said cutting member in engagement with said garment and means for moving said cutting member along said arm toward and from said post.

6. In a garment trimming machine, the combination of means for supporting said garment, a stationary member arranged within said garment and having a continuous shearing edge, a shearing disk arranged outside of said garment and adapted to cooperate with said shearing edge, means for rotating said shearing disk about its axis and means for rotating said shearing disk around said shearing edge.

7. In a garment trimming machine, the combination of a vertical post, means for hanging a garment on said post to hang therearound, a stationary member carried by said post and having a continuous horizontal outwardly extending cutting edge, an arm rotatably mounted on said post, a shearing disk mounted on said arm outside of said garment and movable along said arm to cooperate with said shearing edge, means for rotating said shearing disk around its axis and means for rotating said shearing disk around said shearing edge.

8. In a garment trimming machine, the combination of a vertical post, means for hanging a garment on said post to hang therearound, a stationary member carried by said post and having a continuous horizontal outwardly extending cutting edge, an arm rotatably mounted on said post, a shearing disk mounted on said arm outside of said garment and movable along said arm to cooperate with said shearing edge, means for rotating said shearing disk around its axis, means for rotating said shearing disk around said shearing edge and means for adjusting said garment hanging means vertically relative to said shearing edge and shearing disk.

9. In a garment trimming machine, the combination of means for supporting the garment, a stationary member arranged within said garment and having a continuous shearing edge, a shearing disk arranged outside of said garment and adapted to cooperate with said shearing edge, means for moving said shearing disk into and out of operative relation with said shearing edge, means for rotating said shearing disk about its axis, means for rotating said shearing disk around said shearing edge and means for applying pressure between said shearing edge and shearing disk.

10. In a garment trimming machine, the combination of means for supporting the garment, a stationary member arranged within said garment and having a continuous shearing edge, a shearing disk arranged outside of said garment and adapted to cooperate with said shearing edge, means for moving said shearing disk into and out of operative relation with said shearing edge, means for rotating said shearing disk about its axis, means for rotating said shearing disk around said shearing edge and means actuated through motion derived from the movement of said shearing disk toward and from said shearing edge for applying pressure between said shearing edge and shearing disk.

11. In a garment trimming machine, the combination of means for supporting the garment, a stationary shearing disk arranged within said garment, a stationary friction disk generally concentric with said stationary shearing disk, a rotatable shearing disk arrranged outside of said garment and cooperating with said stationary shearing disk to trim the portion of the garment interposed therebetween, a rotatable friction disk engaging said stationary friction disk, drive means for rotating said rotatable shearing disk through motion derived from said rotatable friction disk and means for moving said rotatable disks around said stationary disks.

12. In a garment trimming machine, the combination of means for supporting the garment, a stationary shearing disk arranged within said garment, a stationary friction disk arranged generally concentric with said stationary shearing disk, an arm rotatable about the axis of said stationary disks, a holder carried by said arm outside of said garment, a rotatable shearing disk carried by said holder and cooperating with said stationary shearing disk to trim the portion of the garment interposed therebetween, and a rotatable friction disk carried by said holder and driving said rotatable shearing disk, said rotatable friction disk engaging said stationary friction disk.

13. In a garment trimming machine, the combination of means for supporting the garment, a stationary shearing disk arranged within said garment, a stationary friction disk arranged generally concentric with said stationary shearing disk, an arm rotatable about the axis of said stationary disks, a holder carried by said arm outside of said garment, a rotatable shearing disk carried by said holder and cooperating with said stationary shearing disk to trim the portion of the garment interposed therebetween, a rotatable friction disk carried by said holder and driving said rotatable shearing disk, said rotatable friction disk engaging said stationary friction disk and means for moving said holder along said arm and into and out of operative relation with said stationary disks.

14. In a garment trimming machine, the combination of means for supporting the garment, a stationary shearing disk arranged within said garment, a stationary friction disk arranged generally concentric with said stationary shearing disk, an arm rotatable about the axis of said stationary disks, a holder carried by said arm outside of said garment, a rotatable shearing disk carried by said holder and cooperating with said stationary shearing disk to trim the portion of the garment interposed therebetween, a rotatable friction disk carried by said holder and driving said rotatable shearing disk, said rotatable friction disk engaging said stationary friction disk and means carried by said arm for moving said holder along said arm and into and out of operative relation with said stationary disks.

15. In a garment trimming machine, the combination of means for supporting the garment, a stationary shearing disk arranged within said garment, a stationary friction disk arranged generally concentric with said stationary shearing disk, an arm rotatable about the axis of said stationary disks, a holder carried by said arm outside of said garment, a rotatable shearing disk carried by said holder and cooperating with said stationary shearing disk to trim the portion of the garment interposed therebetween, a rotatable friction disk carried by said holder and driving said rotatable shearing disk, said rotatable friction disk engaging said stationary friction disk and means carried by said holder for pressing said rotatable friction disk axially into engagement with said stationary friction disk.

16. In a garment trimming machine, the combination of means for supporting the garment, a stationary shearing disk arranged within said garment, a stationary friction disk generally concentric with said stationary shearing disk, a rotatable shearing disk arranged outside of said garment and cooperating with said stationary shearing disk to trim the portion of the garment interposed therebetween, a rotatable friction disk engaging said stationary friction disk, drive means for rotating said rotatable shearing disk through motion derived from said rotatable friction disk, means for holding said garment at the point where said shearing disks engage and means for moving said rotatable disks around said stationary disks.

17. In a garment trimming machine, the combination of means for supporting the garment, a stationary shearing disk arranged within said garment, a stationary friction disk generally concentric with said stationary shearing disk, a rotatable shearing disk arranged outside of said garment and cooperating with said stationary shearing disk to trim the portion of the garment interposed therebetween, a rotatable friction disk engaging said stationary friction disk, drive means for rotating said rotatable shearing disk through motion derived from said rotatable friction disk, means for holding said garment on opposite sides of the point where said shearing disks engage and means for moving said rotatable disks around said stationary disks.

18. In a garment trimming machine, the combination of means for supporting the garment, a stationary shearing disk arranged within said garment, a stationary friction disk generally concentric with said stationary shearing disk, a rotatable shearing disk arranged outside of said garment and cooperating with said stationary shearing disk to trim the portion of the garment interposed therebetween, a rotatable friction disk engaging said stationary friction disk, drive means for rotating said rotatable shearing disk through motion derived from said rotatable friction disk, means for holding said garment at the point where said shearing disks engage, comprising a stationary disk arranged within said garment and means for holding the garment against said last stationary disk immediately adjacent the point where said shearing disks engage and means for moving said rotatable disks around said stationary disks.

19. In a garment trimming machine, the combination of means for supporting the garment, a stationary shearing disk arranged within said garment, a stationary friction disk arranged generally concentric with said stationary shearing disk, an arm rotatable about the axis of said stationary disks, a holder carried by said arm outside of said garment, a rotatable shearing disk carried by said holder and cooperating with said stationary shearing disk to trim the portion of the garment interposed therebetween, a rotatable friction disk carried by said holder and driving said rotatable shearing disk, said rotatable friction disk engaging said stationary friction disk and means for holding the garment at the point where said shearing disks engage.

HENRY LEHDE.